United States Patent
Dou et al.

(10) Patent No.: US 12,548,816 B2
(45) Date of Patent: Feb. 10, 2026

(54) LIQUID COOLING SYSTEM, BATTERY CASING AND BATTERY PACK

(71) Applicant: CALB Co., Ltd., Jiangsu (CN)

(72) Inventors: Fei Dou, Changzhou (CN); Ruisheng Tian, Changzhou (CN); Xucheng Yin, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 876 days.

(21) Appl. No.: 17/840,618

(22) Filed: Jun. 15, 2022

(65) Prior Publication Data

US 2023/0327227 A1 Oct. 12, 2023

(30) Foreign Application Priority Data

Apr. 7, 2022 (CN) .......................... 202220828188.9

(51) Int. Cl.
| | |
|---|---|
| *H01M 10/613* | (2014.01) |
| *F28F 9/02* | (2006.01) |
| *H01M 10/6554* | (2014.01) |
| *H01M 10/6556* | (2014.01) |
| *H01M 10/6567* | (2014.01) |

(52) U.S. Cl.
CPC ......... *H01M 10/613* (2015.04); *F28F 9/0253* (2013.01); *H01M 10/6554* (2015.04); *H01M 10/6556* (2015.04); *H01M 10/6567* (2015.04)

(58) Field of Classification Search
None
See application file for complete search history.

(56) References Cited

U.S. PATENT DOCUMENTS

| | | | | |
|---|---|---|---|---|
| 2015/0079442 A1* | 3/2015 | Haussmann | ...... | H01M 10/6556 429/120 |
| 2020/0161728 A1* | 5/2020 | Wang | ................. | H01M 10/6554 |
| 2021/0265682 A1* | 8/2021 | Lee | ...................... | H01M 50/269 |
| 2024/0021912 A1* | 1/2024 | Xiong | ............... | H01M 10/6571 |

FOREIGN PATENT DOCUMENTS

| | | |
|---|---|---|
| CN | 112201887 | 1/2021 |
| KR | 20210108128 | 9/2021 |
| WO | 2020103804 | 5/2020 |

OTHER PUBLICATIONS

CN 112201887 A new translation from Espacenet (Year: 2020).*
"Search Report of Europe Counterpart Application", issued on Dec. 9, 2022, p. 1-p. 8.

* cited by examiner

*Primary Examiner* — Haroon S. Sheikh
*Assistant Examiner* — Claire A Rutiser
(74) *Attorney, Agent, or Firm* — JCIP GLOBAL INC.

(57) ABSTRACT

A liquid cooling system includes: a liquid cooling plate, a support plate and a water inlet and outlet joint. The support plate includes a first through hole and a second through hole, and is used for fixedly connecting with the outer wall of the casing body of the battery pack. The water inlet and outlet joint is arranged on the support plate, including a water inlet joint and a water outlet joint. One end of the water inlet joint used for connecting with the water inlet port of the liquid cooling plate passes through the first through hole and is connected with the water inlet port in a sealed manner. One end of the water outlet joint used for connecting with the water outlet port of the liquid cooling plate passes through the second through hole and is connected with the water outlet port in a sealed manner.

14 Claims, 4 Drawing Sheets

LIQUID COOLING SYSTEM, BATTERY CASING AND BATTERY PACK

CROSS-REFERENCE TO RELATED APPLICATION

This application claims the priority benefit of China application no. 202220828188.9, filed on Apr. 7, 2022. The entirety of the above-mentioned patent application is hereby incorporated by reference herein and made a part of this specification.

BACKGROUND

Technical Field

The present disclosure relates to the field of battery technology, and in particular, to a liquid cooling system, a battery casing and a battery pack.

Description of Related Art

A battery pack typically includes a casing body and a battery module disposed in the casing body, and the casing body normally includes a bottom plate and a lateral plate, and the bottom plate and the lateral plate are enclosed to form an accommodating cavity. The battery module is disposed in the accommodating cavity. Since the battery pack generates a lot of heat during an operation process, it is necessary to dissipate heat of battery pack during the operation process of the battery pack to prevent the battery pack from being damaged due to high temperature. Conventionally, a liquid cooling plate is set in the casing body to cool the battery. When a water inlet and outlet joint is set in the battery casing, the sealing of the water inlet and outlet joint often fails, which causes the cooling liquid to enter between the battery sets. As a result, not only that the liquid cooling effect of the liquid cooling plate is reduced, but also safety issues of batteries will occur. In view of this problem, in the conventional technology, the water inlet port and water outlet port of the liquid cooling plate are typically arranged outside the casing body to prevent the cooling liquid from flowing into the battery casing in the case where the sealing of the water inlet port and water outlet port fails. However, when the water inlet port and water outlet port are arranged outside the battery casing body, water inlet port and water outlet port are vulnerable to external collisions. Therefore, it is necessary to improve the connection reliability of the water inlet and outlet joint to prevent the failure of liquid cooling effect of liquid cooling plate caused by weak connection and insufficient sealing of the water inlet and outlet joint in the case of collision or vibration of vehicle during use.

SUMMARY

The present disclosure discloses a liquid cooling system, a battery casing and a battery pack.

In order to achieve the above purpose, the disclosure provides the following technical solutions.

A liquid cooling system for a battery pack, and the liquid cooling system includes: a liquid cooling plate, a support plate and a water inlet and outlet joint.

The liquid cooling plate is provided with a water inlet port, a water outlet port and a liquid flow channel. The liquid flow channel is connected with the water inlet port and the water outlet port, and the water inlet port and the water outlet port are both arranged outside the casing body of the battery pack.

The support plate includes a first through hole and a second through hole, and the support plate is used for fixedly connecting with the outer wall of the casing body of the battery pack and used for sealing and fixing the water inlet and outlet joint.

The water inlet and outlet joint includes a water inlet joint and a water outlet joint. One end of the water inlet joint used for connecting with the water inlet port passes through the first through hole and is connected with the water inlet port in a sealed manner. One end of the water outlet joint used for connecting with the water outlet port passes through the second through hole and is connected with the water outlet port in a sealed manner.

In the liquid cooling system provided by the present disclosure, the water inlet port and the water outlet port of the liquid cooling plate are both arranged outside the casing body of the battery pack. The support plate is fixedly connected to the outer wall of the casing body of the battery pack and is sealed and fixed to the water inlet and outlet joint. In this manner, the water inlet and outlet joint may be connected to the outer wall of the casing body of the battery pack through the support plate.

A battery casing includes a lateral plate of a casing body and the liquid cooling system of the present disclosure. The lateral plate of the casing body is fixedly connected with the liquid cooling plate and forms an accommodating cavity for accommodating a battery module with the liquid cooling plate. The support plate is fixed to the lateral plate of the casing body and located outside the accommodating cavity.

A battery pack includes a battery module and the battery casing in the present disclosure, and the battery module is arranged in an accommodating cavity.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

In order to facilitate understanding of the disclosure, the application scenarios of the liquid cooling system of the disclosure are explained below first.

Figure 1:
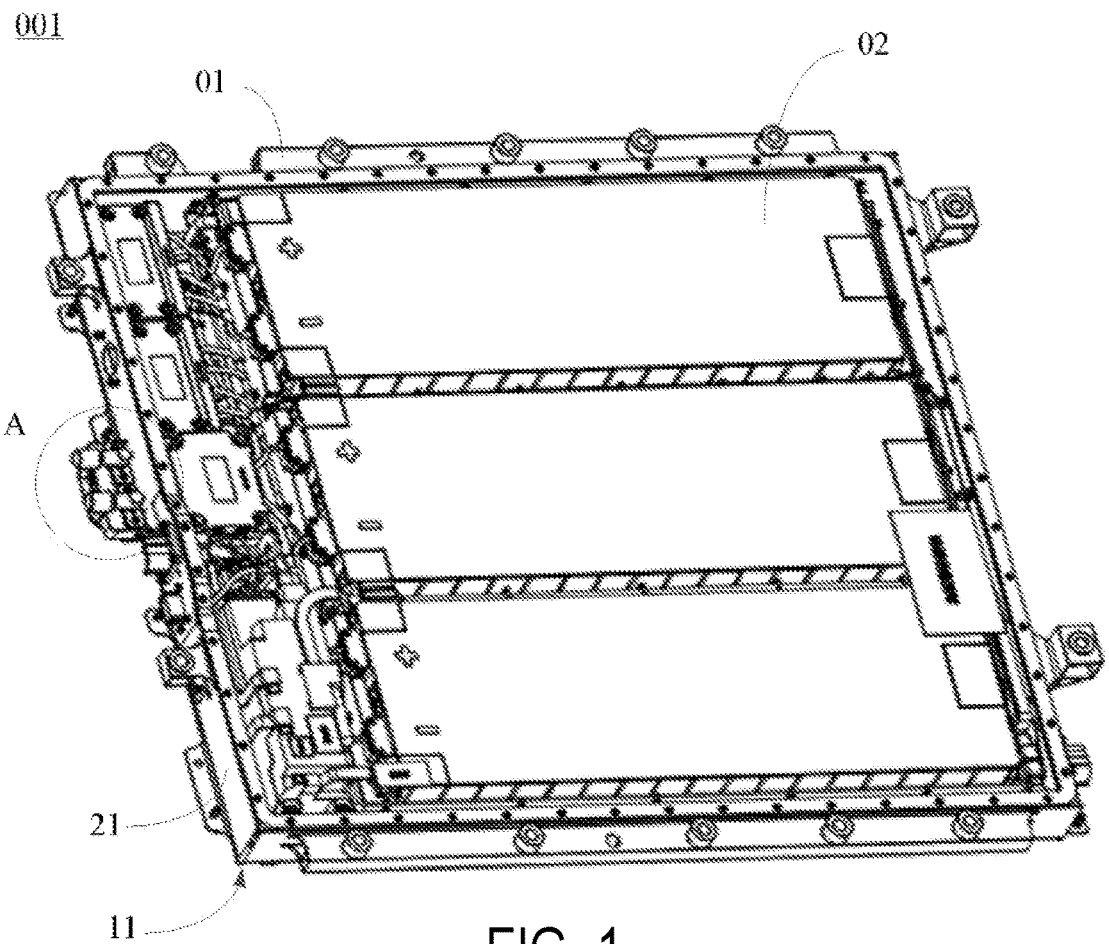
FIG. 1 is a schematic structural view of a battery pack according to an embodiment of the present disclosure.

FIG. 1 is a schematic structural view of a battery pack 001 according to an embodiment of the present disclosure. As shown in FIG. 1, the battery pack 001 of the present disclosure includes a battery casing 01 and a battery module 02, and the battery casing 01 includes a liquid cooling plate 11 and a lateral plate 21. The liquid cooling plate 11 forms a bottom plate of the battery casing 01, the liquid cooling plate 11 and the lateral plate 21 together form an accommodating cavity, and the battery module 02 is arranged in the accommodating cavity.

Since the battery module 02 releases a large amount of heat during operation, in order to prevent the temperature of the battery module 02 from being too high due to heat accumulation, a liquid cooling system may be used to dissipate the heat of the battery module 02. In order to make the cooling liquid circulate in the liquid cooling plate 11, the liquid cooling plate 11 generally includes a water inlet port, a water outlet port and a liquid flow channel arranged between the water inlet port and the water outlet port. The cooling liquid outside the battery casing 01 enters the liquid flow channel through the water inlet port, realizes heat exchange with the battery module 02 during the circulation process in the liquid flow channel, absorbs the heat of the battery module 02, and then flows out of the liquid cooling plate 11 from the water outlet port.

Figure 2:
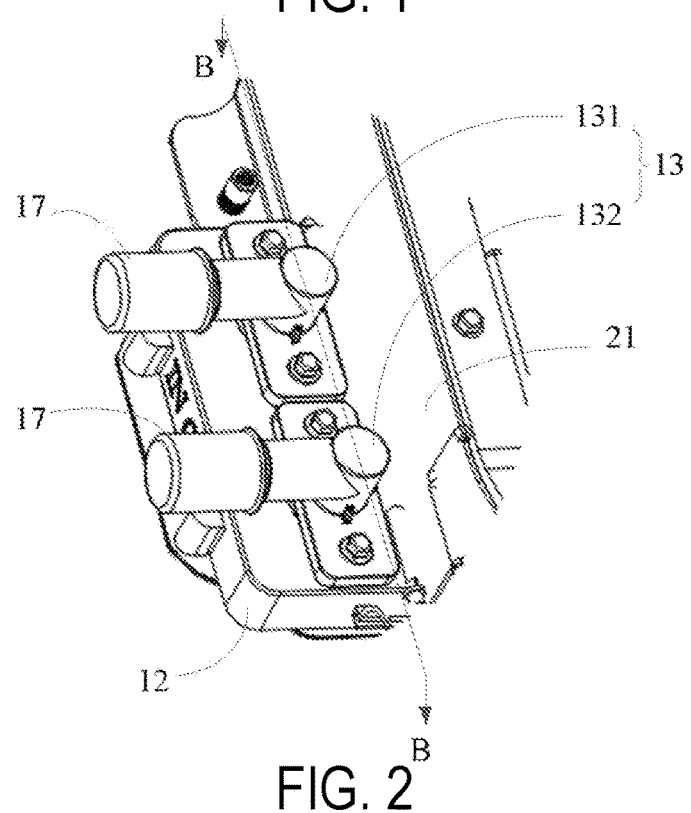
FIG. 2 is a schematic view of the connection structure of the liquid cooling system at the part indicated by A shown in FIG. 1.

FIG. 2 is a schematic view of the connection structure of the liquid cooling system in an embodiment. Referring to FIG. 2, the liquid cooling system includes a liquid cooling plate 11, a support plate 12 and a water inlet and outlet joint 13. The liquid cooling plate 11 is provided with a water inlet port, a water outlet port and a liquid flow channel connecting the water inlet port and the water outlet port. The water inlet port and the water outlet port are both arranged outside the casing body of the battery pack 001.

The support plate 12 is connected with the outer wall of the casing body of the battery casing 01. The support plate 12 and the casing body of the battery casing 01 may be connected through welding, riveting or bolting, etc., which is not specifically limited in the disclosure.

Figure 3:
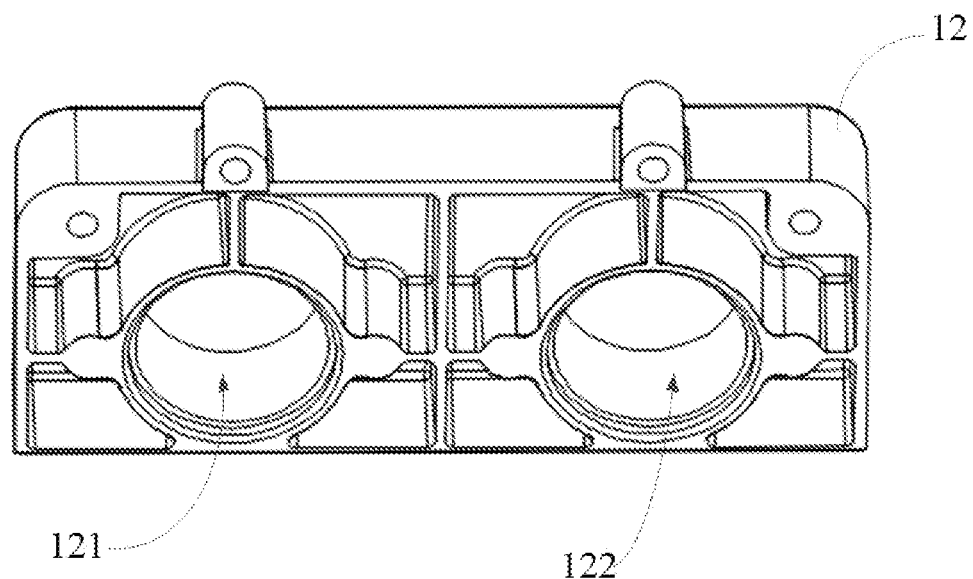
FIG. 3 is a schematic structural view of a support plate.
Figure 4:
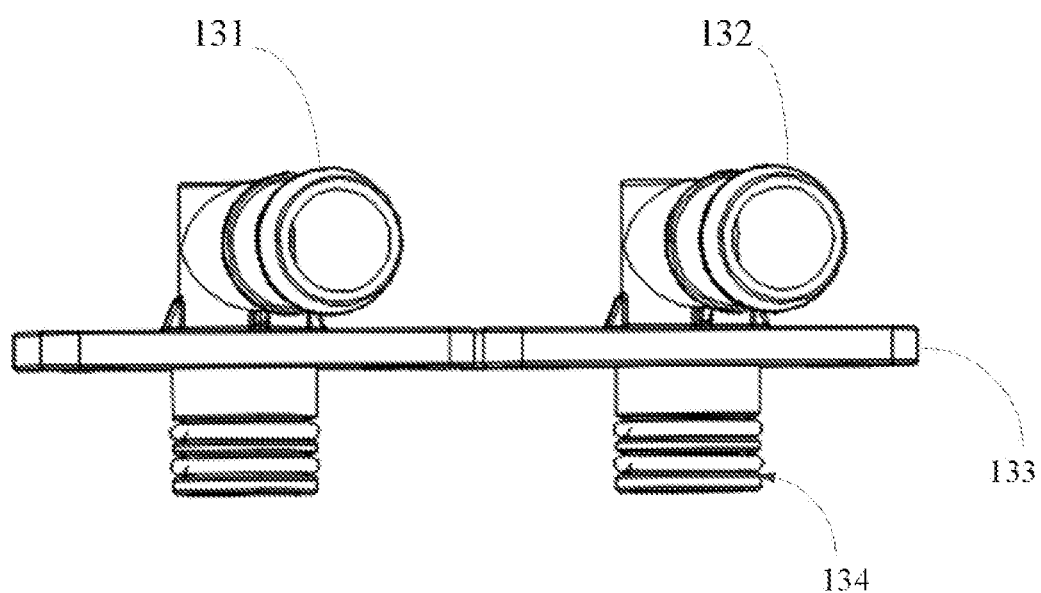
FIG. 4 is a schematic structural view of a water inlet and outlet joint.
Figure 5:
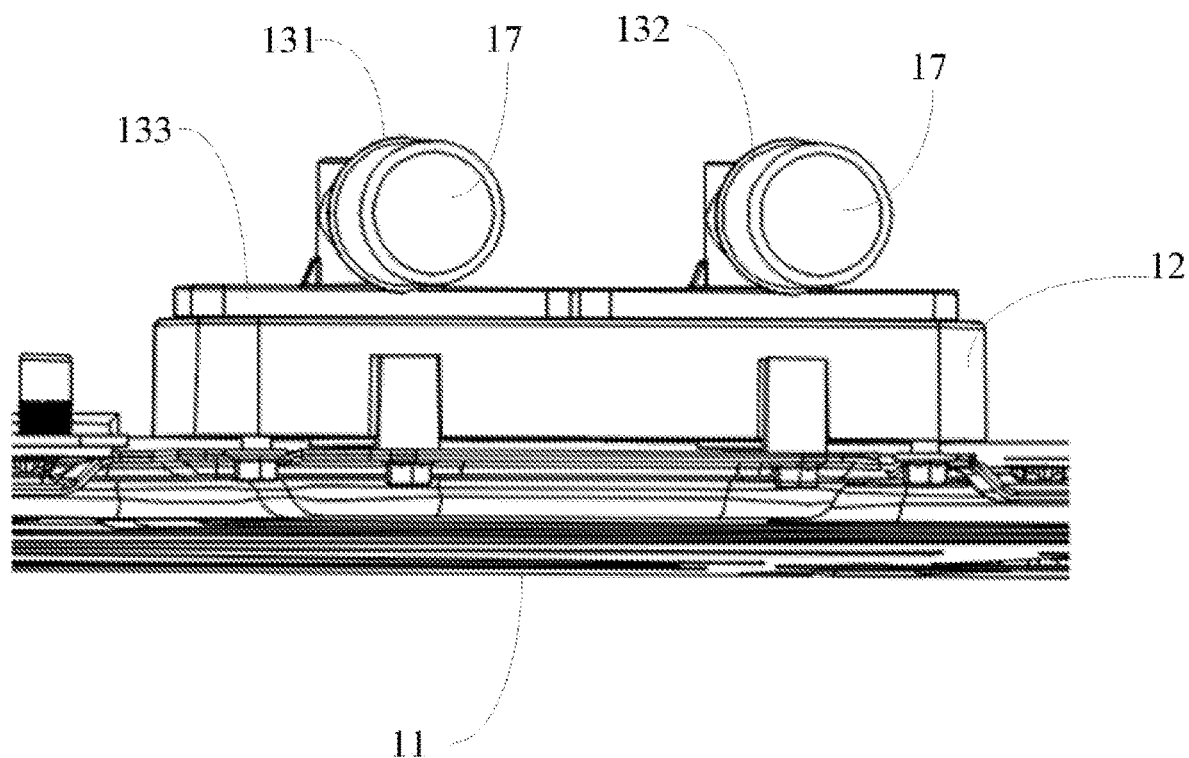
FIG. 5 is a schematic view of a connection relationship between the support plate and the water inlet and outlet joint according to an embodiment.
Figure 6:
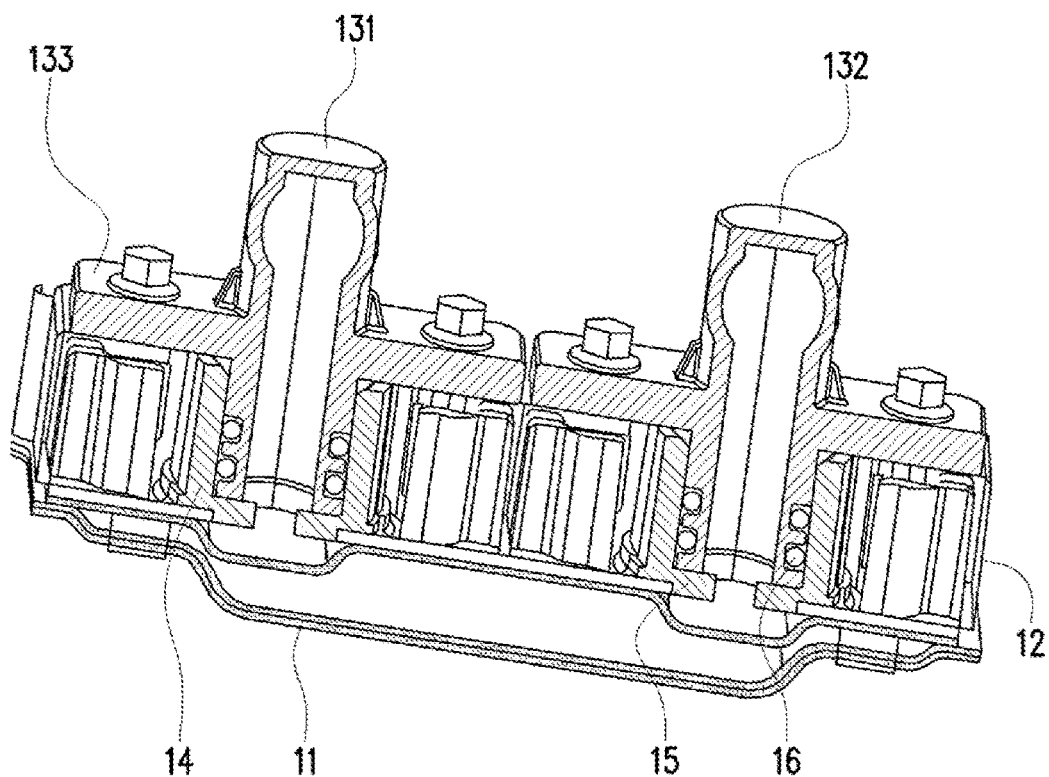
FIG. 6 is a schematic view of a cross-sectional connection structure of the liquid cooling plate, the support plate and the water inlet and outlet joint at line B-B in the structure shown in FIG. 2.

FIG. 3 is a schematic structural view of a support plate, FIG. 4 is a schematic structural view of a water inlet and outlet joint, FIG. 5 is a schematic view of a connection relationship between the support plate and the water inlet and outlet joint according to an embodiment, and FIG. 6 is a schematic view of a cross-sectional connection structure of the liquid cooling plate, the support plate and the water inlet and outlet joint at line B-B in the structure shown in FIG. 2.

As shown in FIG. 3, in the embodiment of the present disclosure, the support plate 12 includes a first through hole 121 and a second through hole 122. Both the first through hole 121 and the second through hole 122 may be columnar hole structures.

As shown in FIG. 3 to FIG. 6, the water inlet and outlet joint 13 is sealed and fixed with the support plate 12. The water inlet and outlet joint 13 includes a water inlet joint 131 and a water outlet joint 132. One end of the water inlet joint 131 for connecting with the water inlet port of the liquid cooling plate 11 passes through the first through hole 121 and is connected to the water inlet port in a sealed manner. One end of the water outlet joint 132 for connecting with the water outlet port of the liquid cooling plate 11 passes through the second through hole 122 and is connected to the water outlet port in a sealed manner. Referring to FIG. 5, one end of the water inlet and outlet joint 13 that is not connected to the liquid cooling plate 11 may be provided with a cap 17 when not applicable to prevent dust and other impurities from entering.

Figure 7:
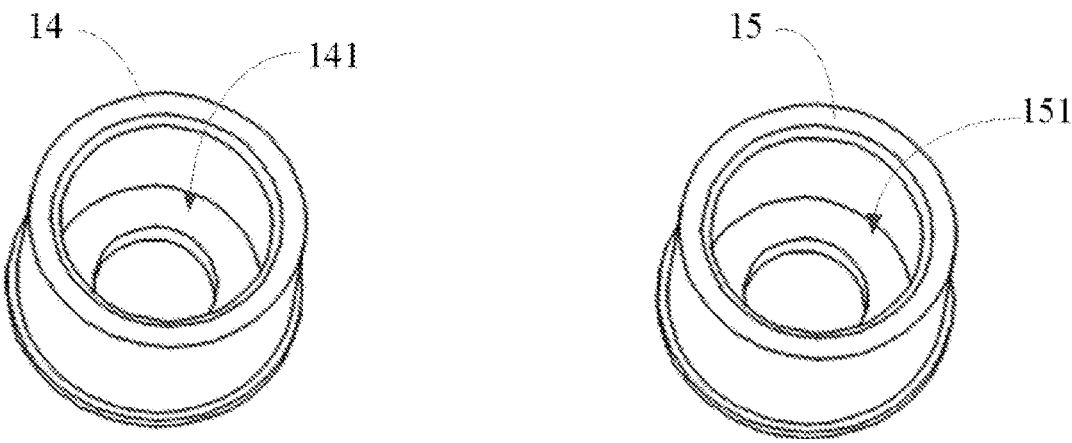
FIG. 7 is a schematic structural view of a water inlet connection pipe and a water outlet connection pipe according to an embodiment.
Figure 8:
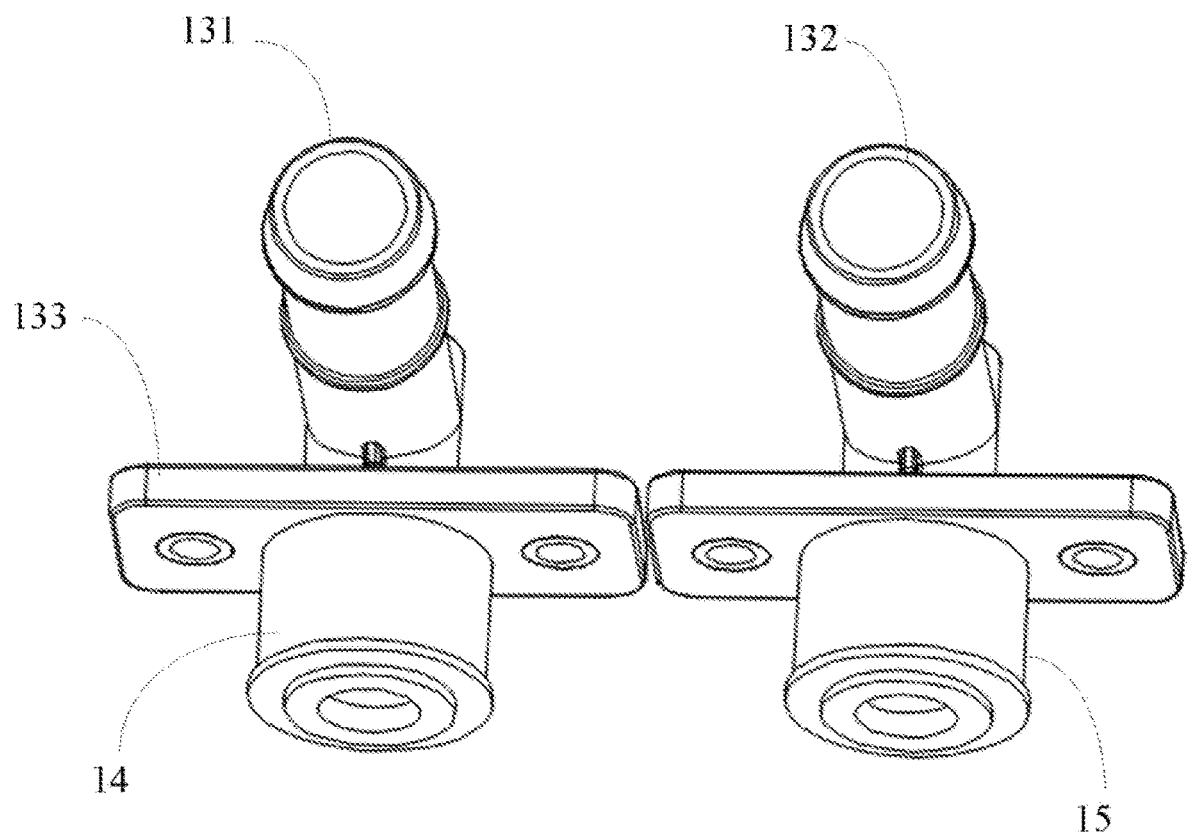
FIG. 8 is a schematic view of the connection structure of the water inlet and outlet joint and the water inlet connection pipe and the water outlet connection pipe according to an embodiment.

Referring to FIG. 6, in order to facilitate connection, the liquid cooling plate 11 further includes a water inlet and outlet connection pipe, and specifically includes a water inlet connection pipe 14 and a water outlet connection pipe 15. FIG. 7 is a schematic structural view of a water inlet connection pipe and a water outlet connection pipe according to an embodiment, FIG. 8 is a schematic view of the connection structure of the water inlet and outlet joint and the water inlet connection pipe and the water outlet connection pipe according to an embodiment. As shown in FIG. 6 to FIG. 8, the water inlet connection pipe 14 is connected to the water inlet port of the liquid cooling plate 11 in a sealed manner, and the water outlet connection pipe 15 is connected to the water outlet port of the liquid cooling plate 11 in a sealed manner. For example, both the water inlet connection pipe 14 and the water outlet connection pipe 15 may be welded with the liquid cooling plate 11.

Referring to FIG. 6 to FIG. 8, in an embodiment, the water inlet connection pipe 14 is provided with a first inner cavity 141 communicating with the water inlet port, and the water outlet connection pipe 15 is provided with a second inner cavity 151 communicating with the water outlet port. The water inlet joint 131 is provided in the first inner cavity 141 and is connected to the lateral wall of the first inner cavity 141 in a sealed manner. The water outlet joint 132 is arranged in the second inner cavity 151 and is connected with the lateral wall of the second inner cavity 151 in a sealed manner.

Referring to FIG. 7, the dimension of an opening of one end of the water inlet connection pipe 14 for connecting with the water inlet port is smaller than the dimension of an opening of one end of the water inlet connection pipe 14 for connecting with the water inlet joint. The dimension of an opening of one end of the water outlet connection pipe 15 for connecting with the water outlet port is smaller than the dimension of an opening of one end of the water outlet connection pipe 15 for connecting with the water outlet joint. In an embodiment, a position-limiting portion, such as a position-limiting ring, may be provided at one end of the water inlet connection pipe 14 for connecting with the water inlet port, so as to control the position of the water inlet joint 131 in the first inner cavity 141, and a position-limiting ring may also be provided at one end of the water outlet connection pipe 15 for connecting with the water outlet port, so as to control the position of the water outlet joint 132 in the second inner cavity 151.

Referring to FIG. 6, a sealing ring 16 is provided between the water inlet joint 131 and the lateral wall of the first inner cavity and between the water outlet joint 132 and the lateral wall of the second inner cavity respectively, and the sealing ring 16 is used to achieve a sealed connection.

Referring to FIG. 4, a position-limiting groove 134 is provided at positions where the water inlet joint 131 and the water outlet joint 132 are in contact with the sealing ring 16 for fixing the position of the sealing ring 16.

Further referring to FIG. 4 and FIG. 6, in an embodiment of the present disclosure, the water inlet and outlet joint 13 not only includes the water inlet joint 131 and the water outlet joint 132, but also includes a connection panel 133. The connection panel 133 is provided between the two ports of the water inlet joint 131 and between the two ports of the water outlet joint 132. The two ports of the water inlet joint 131 and the two ports of the water outlet joint 132 refer to their respective water inlet ports and water outlet ports. The connection panel 133, the support plate 12 and the liquid cooling plate 11 may be fixedly connected. The connection panel 133 may be fixed on the upper surface of the support plate 12, that is, a surface at one side away from the liquid cooling plate. It should be understood that the connection panel 133, the support plate 12 and the liquid cooling plate 11 may be fixed by bolts. For example, bolts may be used to pass through the connection panel 133 and the support plate 12 to connect with the liquid cooling plate 11, and the liquid cooling plate 11 may be set with screw holes matched with the bolts. In this manner, the reliability of the connection between the support plate 12, the water inlet and outlet joint 13 and the liquid cooling plate 11 may be improved.

Through the connection described above, in the process of collision or vibration of the battery pack, due to the fixing function of the support plate, the water inlet and outlet joint and the liquid cooling plate may maintain high connection reliability, so that the connection will not easily loosen and liquid leakage may be prevented, thereby effectively avoiding the failure of liquid cooling effect of the liquid cooling plate due to liquid leakage, and improving the safety and stability of the battery pack.

Since the battery casing provided by the present disclosure includes the liquid cooling system of the present disclosure, under the condition that the liquid cooling system of the present disclosure has high connection reliability, the battery casing of the present disclosure also has the same advantages.

Since the battery pack provided by the present disclosure includes the liquid cooling system of the present disclosure, under the condition that the liquid cooling system of the present disclosure has high connection reliability, the battery pack of the present disclosure also has the same advantages.

In the liquid cooling system provided by the embodiment of the present disclosure, since the water inlet port and the water outlet port of the liquid cooling plate are both arranged outside the casing body of the battery pack, the water inlet and outlet joint is connected to the outer wall of the casing body of the battery pack through the support plate. In this manner, after the water inlet and outlet joint is connected with the liquid cooling plate, the connection position of the two may be set outside the casing body of the battery pack, and the cooling liquid will not flow into the accommodating cavity during the flow process. Therefore, the connection method may prevent the cooling liquid from flowing into the inside of the battery pack casing body due to the loose connection between the water inlet and outlet joint and the liquid cooling plate and avoid damage to the battery module. In this way, the safety of the liquid cooling system is higher. In addition, the support plate is used to fix the water inlet and outlet joint as a structural support for the water inlet and outlet joint, which may improve the connection reliability between the water inlet and outlet joint and the liquid cooling plate.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A liquid cooling system for a battery pack, comprising: a liquid cooling plate, a support plate and a water inlet and outlet joint, wherein the liquid cooling plate is provided with a water inlet port, a water outlet port and a liquid flow channel, the liquid flow channel is connected with the water inlet port and the water outlet port, and the water inlet port and the water outlet port are both arranged outside a casing body of the battery pack;

the support plate comprises a first through hole and a second through hole, and the support plate is used for fixedly connecting with an outer wall of the casing body of the battery pack and used for sealing and fixing the water inlet and outlet joint;

the water inlet and outlet joint comprises a water inlet joint and a water outlet joint, one end of the water inlet joint used for connecting with the water inlet port passes through the first through hole and is connected with the water inlet port in a sealed manner, one end of the water outlet joint used for connecting with the water outlet port passes through the second through hole and is connected with the water outlet port in the sealed manner, wherein the liquid cooling plate further comprises a water inlet connection pipe connected with the water inlet port in the sealed manner, and a water outlet connection pipe connected with the water outlet port in the sealed manner;

the water inlet connection pipe is provided with a first inner cavity communicating with the water inlet port, and the water outlet connection pipe is provided with a second inner cavity communicating with the water outlet port, the water inlet joint is provided in the first inner cavity and is connected to a lateral wall of the first inner cavity in the sealed manner, the water outlet joint is arranged in the second inner cavity and is connected with a lateral wall of the second inner cavity in the sealed manner.

2. The liquid cooling system according to claim 1, wherein both the water inlet connection pipe and the water outlet connection pipe are welded with the liquid cooling plate; a dimension of an opening of one end of the water inlet connection pipe for connecting with the water inlet port is smaller than a dimension of an opening of one end of the water inlet connection pipe for connecting with the water inlet joint; a dimension of an opening of one end of the water outlet connection pipe for connecting with the water outlet port is smaller than a dimension of an opening of one end of the water outlet connection pipe for connecting with the water outlet joint.

3. The liquid cooling system according to claim 1, wherein a sealing ring is provided between the water inlet joint and the lateral wall of the first inner cavity, and the sealing ring is provided between the water outlet joint and the lateral wall of the second inner cavity.

4. The liquid cooling system according to claim 3, wherein a position-limiting groove is provided at positions where the water inlet joint and the water outlet joint are in contact with the sealing ring.

5. The liquid cooling system according to claim 1, wherein the water inlet and outlet joint is provided with a connection panel, the connection panel is provided between two ports of the water inlet joint, and the connection panel is provided between two ports of the water outlet joint; and the connection panel is fixed on a surface at one side of the support plate away from the liquid cooling plate.

6. The liquid cooling system according to claim 1, wherein the water inlet and outlet joint is provided with a connection panel, the connection panel is provided between two ports of the water inlet joint, and the connection panel is provided between two ports of the water outlet joint; and the connection panel is fixed on a surface at one side of the support plate away from the liquid cooling plate.

7. The liquid cooling system according to claim 2, wherein the water inlet and outlet joint is provided with a connection panel, the connection panel is provided between two ports of the water inlet joint, and the connection panel is provided between two ports of the water outlet joint; and the connection panel is fixed on a surface at one side of the support plate away from the liquid cooling plate.

8. The liquid cooling system according to claim 3, wherein the water inlet and outlet joint is provided with a connection panel, the connection panel is provided between two ports of the water inlet joint, and the connection panel is provided between two ports of the water outlet joint; and the connection panel is fixed on a surface at one side of the support plate away from the liquid cooling plate.

9. The liquid cooling system according to claim 4, wherein the water inlet and outlet joint is provided with a connection panel, the connection panel is provided between two ports of the water inlet joint, and the connection panel is provided between two ports of the water outlet joint; and the connection panel is fixed on a surface at one side of the support plate away from the liquid cooling plate.

10. The liquid cooling system according to claim 5, wherein the connection panel, the support plate and the liquid cooling plate are fixedly connected.

11. A battery casing, comprising a lateral plate of the casing body and the liquid cooling system claimed in claim 1, wherein the lateral plate of the casing body is fixedly connected with the liquid cooling plate and forms an accommodating cavity for accommodating a battery module with the liquid cooling plate, and the support plate is fixed to the lateral plate of the casing body and located outside the accommodating cavity.

12. The battery casing according to claim 11, wherein the support plate is welded with the lateral plate of the casing body.

13. A battery pack, comprising a battery module and the battery casing claimed in claim 11, wherein the battery module is arranged in the accommodating cavity.

14. A battery pack, comprising a battery module and the battery casing claimed in claim 12, wherein the battery module is arranged in the accommodating cavity.

\* \* \* \* \*